April 14, 1959 A. H. FAULKNER 2,882,345

REGISTER FOR A TELEPHONE SYSTEM

Filed Aug. 1, 1956 2 Sheets-Sheet 1

INVENTOR.
Alfred H. Faulkner
BY
Smith, Olsen, Baird and Miller
Attys.

April 14, 1959 A. H. FAULKNER 2,882,345

REGISTER FOR A TELEPHONE SYSTEM

Filed Aug. 1, 1956 2 Sheets-Sheet 2

INVENTOR.
Alfred H. Faulkner
BY
Smith, Olsen, Baird and Miller
Attys.

United States Patent Office 2,882,345
Patented Apr. 14, 1959

2,882,345

REGISTER FOR A TELEPHONE SYSTEM

Alfred H. Faulkner, Chicago, Ill., assignor to General Telephone Laboratories, Incorporated, a corporation of Delaware Application August 1, 1956, Serial No. 601,468

8 Claims. (Cl. 179—18)

The present invention relates to automatic telephone systems including therein register-sender apparatus and more particularly, this relates to the register apparatus thereof.

An object of the present invention is to provide in a telephone system a calling register of improved structure and arrangement.

A more specific object of the invention is to provide an improved calling register utilizing semi-conductors and diodes to perform counting and registering operations therein.

Another object of the invention is to provide an improved calling register utilizing transistor circuits to count and register digits on a code basis.

Another object of the invention is to provide in a calling register a transistorized pulse counter circuit provided with a counting chain arranged to count pulses on a binary basis.

A further object of the invention is to provide in a calling register a transistorized pulse counter and a transistorized register arranged to count pulses and register the pulse count on a binary basis.

A further object of the invention is to provide in a calling register, including a pulse counter and count registers, improved transmission circuits utilizing transistors and diodes and controllable at the end of each pulse count for transmitting the pulse count from the pulse counter to one of the count registers.

An additional object of the invention is to provide in a calling register including a counting chain and transmission circuits a partially transistorized control circuit for operating the counting chain to a predetermined setting prior to any series of pulses and for operating the transmission circuits at the end of each series of pulses for transmitting the pulse count therefrom.

Further features of the invention pertain to the particular arrangement of circuit elements in the calling register of the telephone system, whereby the above outlined objects and additional operating features thereof are attained.

Figure 1:
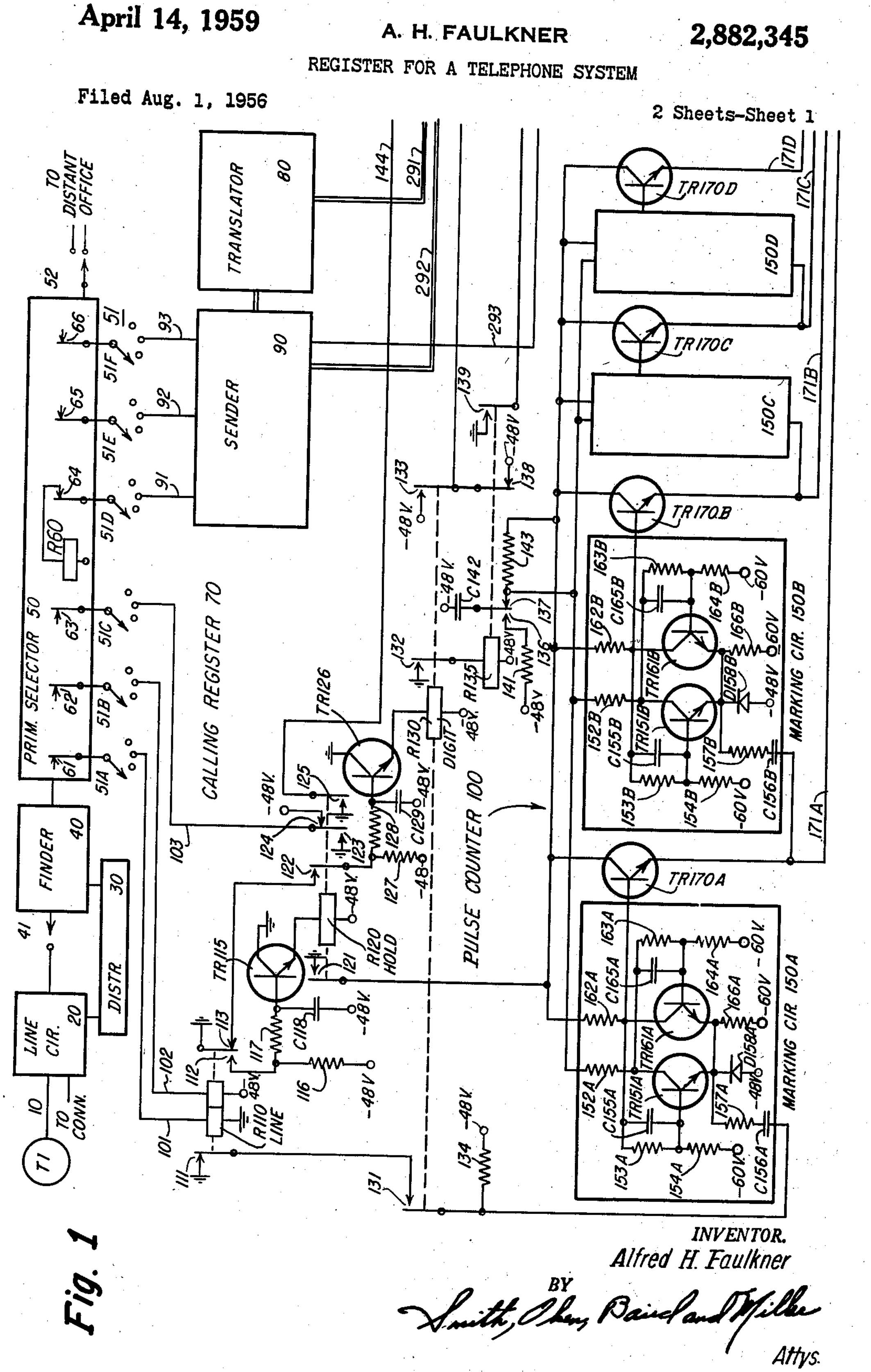
Figure 2:
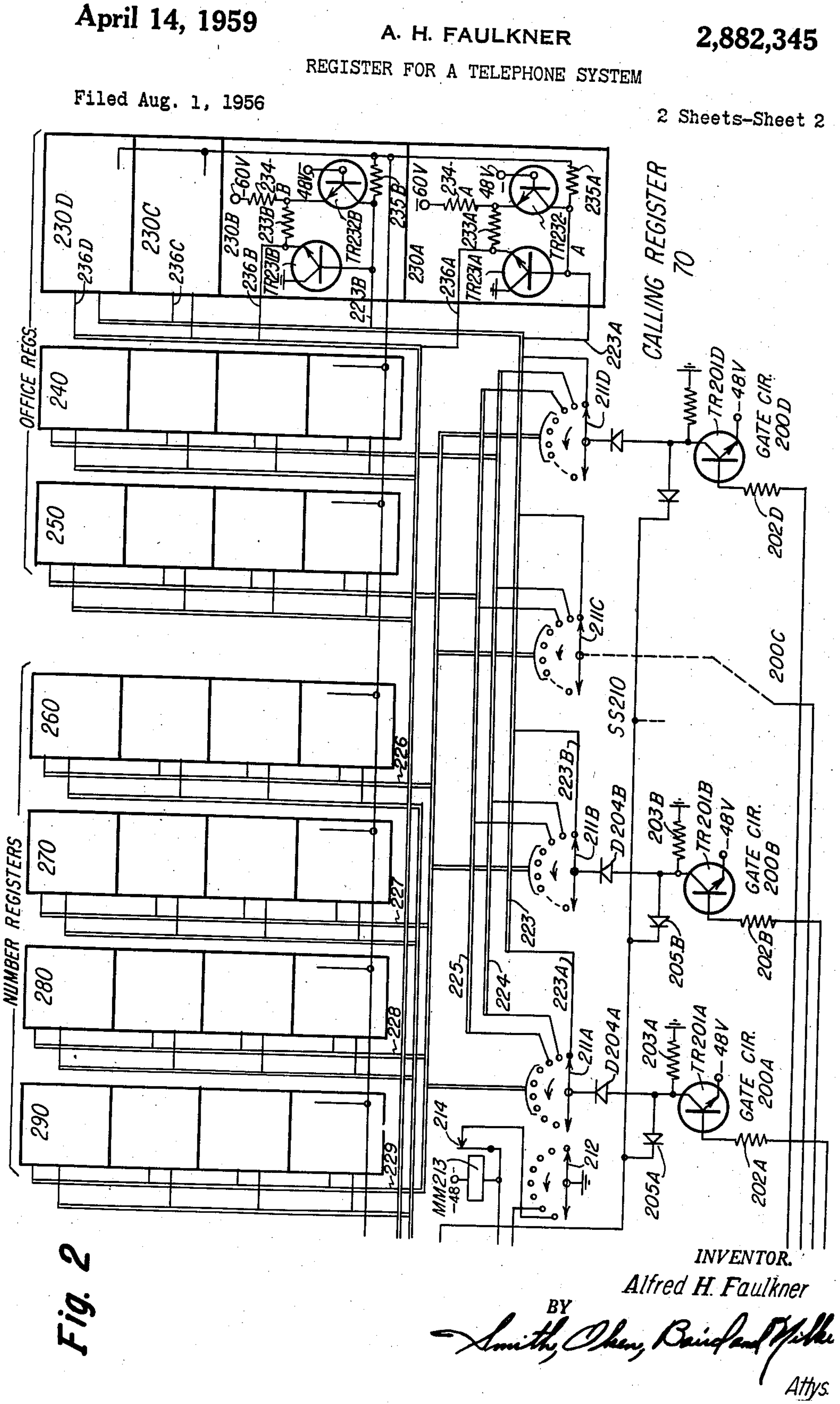

The invention both as to its organization and method of operation, together with the further objects and advantages thereof, will be best understood by reference to the following specification taken in conjunction with the accompanying drawings in which Figures 1 and 2, taken together, illustrate the telephone apparatus of a calling office including a calling register in accordance with the invention.

Referring specifically to Figs. 1 and 2, the calling office illustrated therein serves a plurality of subscriber lines, including the subscriber line 10 extending to the subscriber station T1. The calling office also comprises a plurality of line circuits respectively terminating the subscriber lines and includes the line circuit 20 terminating the subscriber line 10. In addition, the office comprises a distributor 30 operatively connected to the line circuits therein and to a plurality of finder-primary selector groups. The finder-primary selector group illustrated includes the finder 40 and the primary selector 50 of which the finder 40 includes a wiper set 41 having access to the line circuits 20, etc., and the primary selector 50 includes a wiper set 51 having access to a plurality of register-translator-sender groups and includes a wiper set 52 having access to trunks extending to distant telephone offices. The wiper sets 41 and 52 may be of the Strowger type, whereas the wiper set 51 may be of the conventional rotary type. In addition, the primary selector 50 includes a release relay R60 which is operable over one of the wipers of the wiper set 51.

Referring specifically to the primary selector 50, the apparatus included therein is of a conventional arrangement and is adapted to receive digits from the calling subscriber station, to transfer these digits to an idle register-translator-sender group, to receive therefrom control signals for operating the wiper set 52 thereof in order to select an outgoing trunk and to transmit thereover further control signals for operating switching apparatus to extend a connection to the called subscriber station in the distant office. Thereafter, the register-translator-sender group is released from the primary selector 50 and the calling subscriber station is connected through the primary selector to the called subscriber station. The wiper set 51 of the primary selector 50 includes, as illustrated, the wipers 51A, 51B, 51C, 51D, 51E and 51F, operable from the primary selector 50 to rotate step-by-step in a counter-clockwise direction across associated contacts in order to select over the wipers 51 an idle register-translator-sender group and to transmit over the wipers 51A and 51B digits thereto and to receive over the wipers 51E and 51F switching control signals therefrom and to receive over the wiper 51D a release control therefrom for operating the release relay R60 therein.

Each of the register-translator-sender groups comprise, as illustrated by the example in Figs. 1 and 2, a calling register 70, a translator 80, and a sender 90, of which the calling register 70 includes a pulse counter 100, a group of office code registers 230, 240 and 250, and a group of directory number registers 260, 270, 280 and 290. The office code registers 230, etc., are connected via a trunk 291 to the translator 80 and the directory number registers 260, etc., are connected via a trunk 292 to the sender 90, the sender 90 being further connected to the translator 80 via a trunk 85. The pulse counter 100 in the calling register 70 is accessible to the primary selector 50 over the conductors 101, 102 and 103.

The pulse counter 100 includes a group of controls provided with a line relay R110, a transistor TR115, a hold relay R120, transistor TR126, a digit relay R130 and a digit slave relay R135. Also included in the pulse counter 100 are four marking circuits 150A, 150B, 150C and 150D controllable in chain from the control group thereof. The marking circuits are of identical bistable multivibrator structure and there is included in each a pair of transistors, which in the marking circuit 105A are identified as TR151A and TR161A. The output from the marking circuit 150A is applied via a transistor TR170A to a marking conductor 171A extending to the marking circuit 150B and to a gate circuit 200A. Similarly, the marking circuit 150B is connected via a transistor TR170B to a marking conductor 171B extending to the marking circuit 150C and to a gate circuit 200B; the marking circuit 150C is connected via a transistor TR170C to a marking conductor 171C extending to the marking circuit 150D and to a gate circuit 200C; and the marking circuit 150D is connected via a transistor TR170D to a marking conductor 171D extending to a gate circuit 200D.

The gate circuits 200A, etc., are identical, and the gate circuit 200A includes a transistor TR201A, a diode D204A and a diode D205A, the latter of which is normally biased conductive thereby blocking transmission through the gate circuit. The gate circuits are respectively terminated at the wipers of a sequence switch SS210 and are connectible thereat to individual registers included in each of the office code registers 230, etc., and in each of the directory number registers 260, etc. Specifically, the sequence switch SS210 includes the double wipers 211A, 211B, 211C and 211D, respectively accessible to the gate circuits 200A, 200B, 200C and 200D, a control wiper 212, and a motor magnet MM213 for operating the individual wipers step-by-step across the contacts thereof in a counter-clockwise direction from a first or "home" position contact. The individual contacts in each bank of contacts in the sequence switch SS210, starting with the "home" position contact and proceeding counter-clockwise therefrom, are connected via the corresponding trunks 223, 224, 225, 226, 227, 228 and 229, respectively, to the office code registers 230, etc., and the directory number registers 260, etc., respectively.

Each of the registers, for example the office code register 230, comprises four individual registers 230A, 230B, 230C and 230D respectively accessible to the wipers 211A, 211B, 211C and 211D of SS210 and which individual registers are identical in structure; whereof the individual register 230A includes TR231A and TR232A. Accordingly, the marking conductors 171A, etc., have access through the normally blocked gate circuits 200A, etc., respectively, and the associated wipers 211A, etc., to the individual registers initially of the register 230 and to the individual registers successively thereafter of the registers 240, etc., whereby digits are successively registered in the registers 230, etc.; and upon completion of the operation of the calling register 70, the wipers 211A, etc., again associate themselves with the individual registers of the register 230, as is explained in detail hereinafter.

In the translator 80, the office code digits registered in the office code registers 230, etc., are received via the trunk 291 and translated therein to routing digits for controlling the switching apparatus in the telephone system in order to extend a connection from the calling office to the called office; these routing digits are transmitted via the trunk 85 from the translator 80 to the sender 90. In addition to the routing digits, the sender 90 receives the directory number digits registered in the directory number registers 260, etc., as supplied thereto over the trunk 292, and sends the routing digits along with the directory number digits to the primary selector 50. When the sender 90 has sent a full complement of digits an end-of-send pulse is supplied therefrom over the conductor 91, the wiper 51D and contact 64 to the release relay R60 in the primary selector 50 whereby the latter relay is operated. Responsive thereto the register-translator-sender group is released from the primary selector 50 and is made available to other selectors, and the calling subscriber is connected through to the called subscriber.

The translator 80 may be of type disclosed in the copending application to Alfred H. Faulkner, Serial No. 601,467, filed August 1, 1956, and the sender 90 may be of the type disclosed in the copending application to Alfred H. Faulkner, Serial No. 601,465, filed August 1, 1956.

The calling register 70 in accordance with the invention will be better understood by considering the operation thereof in response to the initiation of a call at the subscriber station T1.

Now assuming that a call is initiated at the subscriber station T1 to be extended to a subscriber station in a distant exchange, the line circuit 20 is operated to mark the subscriber line 10 as calling to the finder-selector groups having access thereto and to mark the subscriber line 10 as busy to connectors having access thereto. Additionally, the line circuit 20 operates the distributor 30 to cause a finder in an idle finder-selector group, such for example, as the finder 40, to seize the subscriber line 10 marked as calling thereto. At the same time, the primary selector 50 associated therewith operates to cause the wiper set 51 to select an idle register-translator-sender group. Specifically, the wiper set 51 is rotated step by step in a counter-clockwise direction over its associated contacts until the wiper 51C thereof completes a connection to a control conductor having battery potential thereon. Assuming that the control conductor 103 associated with the calling register 70 is the first control conductor having battery potential marked thereon, the wiper 51C is rotated into engagement with the contact terminating the control conductor 103 and the other wipers 51A, etc., of the wiper set 51 complete connections to the corresponding contacts thereof.

Thereafter, when the finder 40 seizes the calling subscriber line 10, a connection is completed from the subscriber station T1 to the primary selector 50 whereby a further connection is completed therein extending to the call register 70 for operating the line relay R110 in the pulse counter 100 thereof. Specifically, the connection completed in the selector 50 to the calling register 70 extends via contacts 61, wiper 51A, conductor 101 and one winding of relay R110 to ground potential and extends via contacts 62, wiper 51B, conductor 102 and the other winding of relay R110 to battery potential (−48 volts), whereby the windings of relay R110 are energized and the relay is operated. Upon operating, the line relay R110 completes at contacts 112 a circuit from ground potential extending via resistor 116 to battery potential and another circuit from ground potential extending via the current limiting resistor 117 to the junction between a capacitor C118 and the base electrode of the transistor TR115. The other terminal of the capacitor C118 is connected to −48 volts whereby the capacitor is charged in a period determined by the values of 117 and C118. The collector electrode of TR115 is connected to ground potential and the emitter electrode is connected via the winding of the hold relay R120 to −48 volts so that when the charging circuit is first completed no current flows in the emitter of TR115 but as the capacitor C118 charges the potential on the base of TR115 increases and the emitter follows, causing a current flow in the collector-emitter path thereof and through the winding of R120, whereby the later relay is operated. Upon operating the relay R120 closes contacts 121 for applying ground potential to the marking circuits 150A, etc., for operating these circuits, opens contacts 124 for removing idle marking battery from the control conductor 103, and closes contacts 123 to apply ground potential to the control conductor 103, whereby the register-translator-sender group including the calling register 70 is marked as busy to the selectors having access thereto. In addition, relay R120 prepares at contacts 122 a circuit for thereafter operating the transistor TR126 and the digit relay R130 and closes at contacts 125 ground potential to the conductor 144 extending to the office code registers 230, etc., and to the directory number registers 260, etc., for enabling the individual registers therein.

Considering now the operation of the marking circuits 150A, 150B, 150C and 150D, and referring specifically to the marking circuit 150A, for example, the ground potential applied via contacts 121 is extended via resistor 162A to the junction between the collector electrode of the transistor TR161A and a voltage divider including resistors 153A and 154A extending to −60 volts. The base electrode of the transistor TR151A therein is connected to the junction between the resistors 153A and 154A and the values of the resistors 162A, 153A and 154A are chosen so that at this time the potential at the collector electrode of the transistor TR161A is at substantially ground potential and the potential at the base electrode of the transistor TR151A is intermediate between −48 volts and ground potential. At the same time ground potential via contacts 121 is applied through a resistor 143 to a junction between a resistor 152A in the marking circuit 150A and a connection extending via contacts 137 and a capacitor C142 to −48 volts. The resistor 152A is connected in the marking circuit 150A to the junction between the collector electrode of the transistor TR151A and a voltage divider including the resistors 163A and 164A extending to −60 volts; whereby at this time, and due to the heavy charging current drawn through the resistor 143 by the capacitor C142, the potential established via the resistor 152A on the collector electrode of TR151A is substantially −48 volts and the potential established on the base electrode of the transistor TR161A, connected to the junction between resistors 163A and 164A is intermediate between −48 volts and −60 volts. The emitter electrodes of the transistors TR151A and TR161A are connected to the junction between a diode D158A extending to −48 volts and a resistor 166A extending to −60 volts so that the potential on these emitter electrodes is susbtantially −48 volts. Accordingly, the transistor TR151A is biased conductive in its base-emitter path and TR161A is biased non-conductive in its collector-base path; a heavy current is drawn through the collector-emitter path of TR151A thereby establishing the collector thereof at substantially −48 volts and maintaining TR161A non-conductive; and the collector electrode of TR161A, which is further connected to the base electrode of the transistor TR170A, is at substantially ground potential. As a result the transistor TR170A, which is connected in a grounded collector circuit, is conductive so that the emitter electrode thereof and the marking conductor 171A, connected thereto are established at substantially ground potential. The same operating action takes place in the marking circuits 150B, 150C and 150D whereby the transistors TR170B, TR170C and TR170D are conductive so that the marking conductors 171B, 171C and 171D are established at substantially ground potential.

Referring now specifically to the office code registers 230, etc., and to the directory number registers 260, etc., the ground potential applied at the contacts 125 is extended via conductor 144 to each of the individual registers therein, including the individual register 230A in the office code register 230. Therein the transistor TR232A is connected as a grounded base amplifier and the transistor TR231A is connected as a cathode follower having the collector of TR232A coupled to its base electrode. Specifically, the base electrode of TR232A is connected to −48 volts, the emitter electrode is connected to the junction between resistors 233A and 234A connected as a voltage divider between the emitter electrode of TR231A and −60 volts, and the collector is connected to the base of TR231A and via resistor 235A to the conductor 144. Prior to the application of ground potential to the conductor 144, the transistor TR232A is conductive in its base-emitter path with the emitter at substantially −48 volts and when ground potential is applied to conductor 144 at the contacts 125 the transistor TR232A is rendered highly conductive in its collector-emitter path so that the emitter is maintained at approximately −48 volts. Accordingly, the base and emitter electrodes of TR231A are at approximately −45 volts so that the emitter of TR232A is established at a potential intermediate between −45 volts and −60 volts as determined by the values of resistors 233A and 234A. Thus, the output conductor 236A of the register 230A extending from the junction between resistor 233A and the emitter of TR231A is at approximately −45 volts. The other individual registers in the office code registers 230, etc., and in the directory number registers 260, etc., are operated in the same manner so that the output conductor of each is at approximately −45 volts.

Recapitulating, in response to the seizure of the calling subscriber line 10 by the finder 40 the register-translator-sender group including the calling register 70 is seized. In the call register 70 the pulse counter 100 is operated so that the group is marked as busy to other selectors having access thereto, the marking circuits 150A, etc., are operated so that the marking conductors 171A, etc., are established at ground potential, the individual registers in the office code registers 230, etc., and in the directory number registers 260, etc., are operated so that the respective output conductors extending therefrom are established at approximately −45 volts. Additionally, the wipers of the sequence switch SS210 are positioned in engagement with the contacts terminating the conductors extending to the individual registers 230A, etc., in the office code register 230, and the gate circuits 200A, etc., connecting the marking conductors 171A, etc., to the wipers of the sequence switch SS210 are in their blocking condition. At this time the calling register 70 is prepared to receive a series of dialing impulses corresponding to the first digit dialed at the subscriber station T1.

Thereafter, the party at the calling subscriber station T1 proceeds to dial the called number. For purposes of illustration it is assumed that the called number is composed of seven (7) digits of which the first three (3) digits are the office code digits and identify the distant office in which the called subscriber station is located; and the last four (4) digits are the directory number digits and identify the subscriber station in the called office. In response to the dialing of the first digit, a series of digit impulses corresponding thereto is sent from the subscriber station T1 and is received in the primary selector 50 whereat the circuit extending therefrom to the line relay R110 in the calling register 70 is interrupted and recompleted a corresponding number of times so that the relay R110 is restored and reoperated in accordance with each digit impulse in the series.

Upon restoring the relay R110 prepares at contacts 111 a circuit for applying ground pulses to the marking circuit 150A and completes at contacts 113 a circuit from ground potential via contacts 122 and resistor 128 to the capacitor C129 and the base of the transistor TR126 whereby the capacitor C129 is charged and the transistor TR126 is rendered conductive, in a manner as explained above with reference to capacitor C118 and the transistor TR115, so that a large current flows through the collector-emitter path of TR126 for operating the digit relay R130. At the same time the relay R110 interrupts at contacts 112 the circuit for operating the transistor TR115 which, nevertheless, is maintained conductive due to the charge on capacitor C118 and the high impedance of the discharge path therefor through the resistors 117 and 116 to battery potential.

Upon operating the digit relay R130 completes at contacts 131 the circuit previously prepared at contacts 111 for applying ground pulses to the marking circuit 150A, completes at contacts 132 a circuit for operating the digit slave relay R135 and completes at contacts 133 a connection in multiple with the connection completed at contacts 138 from −48 volts to the gate circuits 200A, 200B, 200C and 200D whereby these circuits are blocked in a manner as described hereinafter.

Referring specifically to the circuit completed at contacts 131, prior to the completion thereof the capacitor C156A in the marking circuit 150A is substantially discharged in a path from −48 volts via a resistor 134, the capacitor C156A and a resistor 157A to −48 volts at the junction between the diode D158A and the resistor 166A. However, when contacts 131 are closed ground potential is applied to the junction between the resistor 134 and the capacitor C156A so that for the instant that it takes to charge the capacitor 156A through the resistor 157A the emitter electrode of the conductive transistor TR151A is biased positive with respect to the base thereof, thereby rendering TR151A non-conductive. The collector current thereof is cut off so that the collector of TR151A swings positive thereby causing the potential on the base electrode of TR161A to swing positive and to bias TR161A conductive in the base-emitter path thereof. Accordingly, the collector of TR161A and the base of TR170A are established at substantially —48 volts whereby the emitter of TR170A follows thereby establishing the potential on the marking conductor 171A at substantially —48 volts and discharging the capacitor C156B in the marking circuit 150B.

Referring now to the digit slave relay R135, upon operating the relay R135 interrupts at contacts 137 the charging circuit through the resistor 143 for the capacitor C142 and completes at contacts 136 a circuit for discharging the capacitor C142 through the resistor to battery potential. At the same time relay R135 interrupts at contacts 138 one of the multiple connections from battery to the gate circuits and completes at contacts 139 a circuit for energizing the motor magnet MM213 of the sequence switch SS210, which switch is not operated at this time, it being of the release type.

At the end of the digit impulse the circuit completed through the windings of the line relay R110 is recompleted, whereby R110 reoperates thereby opening contacts 111 and 113 and closing contacts 112. Upon opening, the contacts 111 interrupt the circuits for applying ground potential to the capacitor C156A of the marking circuit 150A whereby the capacitor discharges through the resistor 134 to —48 volts. At the contacts 113 the circuit for operating the transistor TR126 is interrupted but the latter is maintained operative due to the charge on the capacitor C129 and the high impedance of the discharge path therefor including the resistors 127 and 128. At contacts 112 the circuit is recompleted for recharging the partially discharged capacitor C118. Thus, at the conclusion of the first digit impulse the transistors TR115 and TR126 are conductive; the line relay R110, the hold relay R120, the digit relay R130 and the digit slave relay R135 are operated; the transistor TR170A is substantially non-conductive and the transistors TR170B, TR170C and TR170D are full conductive, whereby the marking conductor 171A is at substantially —48 volts and the marking conductors 171B, 171C and 171D are at substantially ground potential.

Assuming that the series of digit impulses resulting from the first digit dialed by the party at the subscriber station T1 includes at least a second digit impulse, in response thereto the line relay R110 is again restored whereby a ground pulse is applied via contacts 111 and 131 to the capacitor C156A of the marking circuit 150A so that the conductive transistor TR161A is rendered non-conductive and the non-conductive transistor TR151A is rendered conductive in the same manner as described above with reference to the operation of the marking circuit 150A in response to the first digit impulse, whereby the transistor TR170A is conductive with ground potential on the emitter electrode thereof and on marking conductor 171A. Ground on the marking conductor 171A is applied to the capacitor C156B of the marking circuit 150B whereby the latter is charged causing the conductive transistor TR151B therein to be rendered non-conductive, the conductive transistor TR170B thereof to be rendered nonconductive and the non-conductive transistor TR161B to be rendered conductive. Accordingly, the marking conductor 171B is at substantially —48 volts. At the end of the second digit impulse relay R110 is again operated whereby ground potential is removed from the capacitor C156A of the marking circuit 150A and the last named capacitor is discharged through resistor 134 to battery potential. Thus, at the conclusion of the second digit impulse the transistors TR115 and TR126 are conductive; the relays R110, R120, R130, and R135 are operated; the transistors TR170A, TR170C and TR170D are full conductive and the transistor TR170B is substantially non-conductive; and the marking conductors 171A, 171C and 171D are at substantially ground potential and the marking conductor 171B is at substantially —48 volts.

Should the digit dialed by the party at the subscriber station T1 cause a third digit impulse, the line relay R110 is restored in response thereto, whereby in the marking circuit 150A the transistor TR151A is rendered non-conductive and the transistor TR170A is substantially non-conductive so that the marking conductor 171A is at substantially —48 volts and the capacitor C156B in the marking circuit 150B is discharged in a manner as previously explained. At the end of the third digit impulse the line relay R110 is reoperated whereby the capacitor C156A of the marking circuit 150A is discharged. Thus, at the conclusion of a third digit impulse the transistors TR115 and TR126 are conductive; the relays R110, R120, R130 and R135 are operated; the transistors TR170A and TR170B are substantially non-conductive and the tranistors TR170C and TR170D are conductive; and the marking conductors 171A and 171B are at substantially —48 volts and the marking conductors 171C and 171D are at substantially ground potential.

From the foregoing explanation of the operation of the pulse counter 100 and the marking circuits 150A, 150B, 150C and 150D, it will be readily understood that in accordance with the dialing of any digit from one to zero, inclusive, at the subscriber station T1 the marking conductors 171A, 171B, 171C and 171D will be marked with voltages as follows:

| Digit Value | Marking Voltages | | | |
|---|---|---|---|---|
| | Conductor 171A | Conductor 171B | Conductor 171C | Conductor 171D |
| 1 | —48 | 0 | 0 | 0 |
| 2 | 0 | —48 | 0 | 0 |
| 3 | —48 | —48 | 0 | 0 |
| 4 | 0 | 0 | —48 | 0 |
| 5 | —48 | 0 | —48 | 0 |
| 6 | 0 | —48 | —48 | 0 |
| 7 | —48 | —48 | —48 | 0 |
| 8 | 0 | 0 | 0 | —48 |
| 9 | —48 | 0 | 0 | —48 |
| 0 | 0 | —48 | 0 | —48 |

At the end of the series of digit impulses corresponding to the first digit dialed at the subscriber station T1 the line relay R110 is maintained operated and the contacts 113 are opened; whereby the transistor TR126 is maintained conductive only for the period necessary to discharge the capacitor C129 through a path including the resistors 127 and 129. Thus, a short time after the last digit impulse in any series of digit impulses the transistor TR126 is rendered non-conductive and the digit relay R130 restores. Upon restoring, the digit relay R130 interrupts at contacts 131 the circuit for applying ground pulses to the capacitor C156A of the marking circuit 150A and interrupts at contacts 132 the circuit for energizing relay R135 and interrupts at contacts 133 the circuit for blocking the gate circuits 200A, 200B, 200C and 200D. A short time thereafter, the digit slave relay R135, being of the slow-to-release type, restores and recompletes at contacts 138 the circuit for blocking the gate circuits 200A, 200B, 200C and 200D and interrupts at contacts 139 the circuit for energizing the motor magnet MM213 whereby the wipers of the sequence switch SS210 are operated one step in the counter-clockwise direction to engage the contacts terminating the conductors of the trunk 224. Additionally, the relay R135 upon restoring completes at contacts 137 the previously traced circuit from ground potential via contacts 121 and resistor 143 for charging the capacitor C142 so that in the marking circuits 150A, etc., the collector electrodes of the transistors TR151A, TR151B, etc., have applied thereto battery potential; accordingly, these transistors are rendered conductive and any conductive ones of the transistors TR161A, TR161B, etc., are rendered non-conductive and the transistors TR170A, TR170B, TR170C and TR170D are rendered conductive in a manner as previously explained, so that the marking conductors 171A, etc., are established at substantially ground potential.

It is apparent from the foregoing that during the short time interval between the restoring of relay R130 and the restoring of relay R135 the circuit for blocking the gate circuits 200A, etc., is interrupted at contacts 133 and 138. Considering now the operation of the gate circuits when the blocking circuit is completed and again when the blocking circuit is interrupted, and referring specifically to the gate circuit 200A, it is pointed out that the anodes of the diodes D204A and 205A and the collector of the transistor TR201A are connected at a common junction to a resistor 203A which extends to ground potential. The cathode of D204A is connected to the wiper 211A of the sequence switch SS210, the cathode of D205A is normally connected to −48 volts via at least one of the contacts 133 and 138 of the blocking circuit, the emitter of TR201A is connected to −48 volts and the base of TR201A is connected via resistor 202A to the marking conductor 171A. The wiper 211A during the first digit is further connected via the conductor 223A of the trunk 223 to the individual register 230A in the office code register 230 and therein to the junction between the base of TR231A and the collector of TR232A which, as previously explained, is at approximately −45 volts. Thus, when the blocking circuit is completed the cathode of D205A is at −48 volts and the cathode of D204A is at approximately −45 volts whereby the diode D205A is rendered conductive in a path from ground potential via resistor 203A, D205A and contacts 133 or 138 to −48 volts and the junction between D204A, D205A, resistor 203A and the collector of TR201A is established at −48 volts. Accordingly, the diode D204A is non-conductive and the transistor TR201A is not operative, regardless of the marking potential applied thereto via the marking conductor 171A.

However, at the end of the first series of dialing impulses and during the brief interval when negative battery is removed from the cathode of the diode D205A by the interruption of the blocking circuit at contacts 133 and 138, this diode is non-conductive and the gate circuit 200A is rendered responsive to the potential established on the marking conductor 171A.

Now, assuming that the marking conductor 171A has ground potential established thereon at the time that the diode D205A is rendered non-conductive, the transistor TR201A is biased conductive in its base-emitter path and draws a heavy collector current through resistor 203A whereby the potential on the collector is established at approximately −48 volts. In this circumstance the diode D204A is biased non-conductive so that the operating state of the individual register 230A is not affected.

Now, assuming that the potential established on the marking conductor 171A is −48 volts at the time that the diode D205 is non-conductive, the transistor TR201A is maintained substantially non-conductive whereby the potential on the anode of diode D204A is established at substantially ground potential via resistor 203A and D204A is biased conductive so that ground potential on the anode there is extended via the wiper 211A and the conductor 223A to the junction between the base of the transistor TR231A and the collector of the transistor TR232A in the individual register 230A. Therein, ground potential applied to the base of TR231A over the above traced path causes ground potential to appear on the emitter electrode thereof so that the voltage established on the emitter of TR232 at the junction between resistors 233A and 234A is positive with respect to −48 volts on the base electrode thereof, whereby the transistor TR232A is rendered non-conductive, the voltage on the output conductor 236A is established at substantially ground potential and the transistor TR231A is locked conductive by ground potential applied to the base thereof via conductor 144 and resistor 235A.

In view of the foregoing it will be understood that when the first digit dialed at the subscriber station T1 is, for example, "1" the calling register 70 is operated so that the marking conductor 171A therein is established at −48 volts and the marking conductors 171B, 171C and 171D are established at ground potential, the gate circuits 200A, etc., are operated so that in the office code register 230 the output conductor 236A of the individual register 230A has ground potential established thereon and the output conductors of the individual registers 230B, 230C and 230D are maintained at approximately −45 volts. In this manner the first digit "1" is registered in the office code register 230.

Accordingly, at the conclusion of the first series of dialing impulses the first digit dialed by the party at the subscriber station T1 is registered in the first office code register 230, the transistor TR115 is conductive and the relay R120 is operated, the transistor TR126 is non-conductive and the relays R130 and R135 are restored, the marking circuits 150A, etc., are reset, the marking conductors 171A, etc., are established at ground potential, and, the gate circuits 200A, etc., are blocked. In addition, the wipers 211A, etc., of the sequence switch SS210 have been operated to engage the contacts terminating the conductors of the trunk 224 extending to the individual registers of the office code register 240, and the calling register 70 is prepared to receive a series of digit impulses corresponding to a second digit dialed by the subscriber at the calling station T1 and to register the second digit in the second office code register 240.

Upon dialing of the second digit at the subscriber station T1 the pulse counter 100 of the calling register 70 is operated in a manner as described above whereby the transistor TR126 is rendered conductive and the relays R130 and R135 are operated. In accordance therewith a circuit is prepared at contacts 131 for operating the marking circuits 150A, etc., and a circuit is completed at contacts 139 for energizing the motor magnet MM213 which is not operated at this time. Thereafter, the digit impulses corresponding to the dialed second digit operate the marking circuits 150A, etc., in a manner as explained above. At the end of the second digit the gate circuits 200A, etc., are unblocked for a brief period so that the individual registers in the office code register 240 are operated via the conductors of the trunk 224 in accordance with the markings on the control conductors 171A, etc. Thereafter, the gate circuits 200A, etc., are again blocked, the marking circuits 150A are reset and the wipers of the sequence switch SS210 are stepped to engage the contacts terminating the conductors of the trunk 225 extending to the individual registers in the third office code register 250.

In a similar manner the third, fourth, fifth, sixth and seventh digits dialed at the subscriber station T1 are respectively registered in the individual registers of the office code register 250 and the directory number registers 260, 270, 280 and 290.

At the end of the registration of the third digit in the office code register 250, the marking on the output conductor extending from the individual registers in the office code registers 230, 240 and 250 extending via the trunk 291 to the translator 80 causes the translator 80 to translate the registered office code digits to routing digits in a manner which is described in detail in the copending application to Alfred H. Faulkner, Serial No. 601,467, filed August 1, 1956, which routing digits are applied via the trunk 85 to the sender 90. However, at this time the sender 90 is not operated but the routing digits are marked thereto. At the end of the registration of the fourth, fifth and sixth digits, markings on the output conductors extending from the individual registers in the directory number registers 260, 270 and 280, respectively, are applied via the trunk 292 to the sender 90. In addition, at the end of the registration of the sixth digit in the directory number register 280 and at the time that the wipers of the sequence switch SS210 are stepped to engage the contacts terminating the conductors extending to the individual registers in the directory number register 290, a circuit is completed at the control wiper 212 of the switch SS210 for applying ground potential to the start conductor 293 extending to the sender 90 whereby the sender is operated. Thereupon, the sender 90 is operated so that the routing digits marked thereto over the trunk 85 and the directory number digits marked thereto from the directory number registers 260, 270 and 280 are successively sent over the conductors 92 and 93 to the primary selector 50. While this sending operation is proceeding the calling register 70 is operated in accordance with the seventh digit dialed at the subscriber station T1 so that the seventh digit is registered in the directory number register 290 and is further applied to the sender 90, wherein this digit is also sent to the primary selector 50.

At the end of the seventh digit the wipers of the sequence switch SS210 are stepped into engagement with the eighth set of contacts thereof whereby the control wiper 212 applies ground potential via contacts 214 to the motor magnet MM213 which is energized and interrupts the energizing circuit at the contacts 214, whereby the wipers of SS210 are stepped into engagement with the first set of contacts therein respectively terminating the conductors of the trunk 223.

In the sender 90, and as is described in detail in the copending application to Alfred H. Faulkner Serial No. 601,465, filed August 1, 1956, when the last or seventh digit has been sent therefrom to the primary selector 50, the sender 90 is restored and a ground pulse is applied via the control conductor 91, the wiper 51D of the switch 51 and contacts 64 to the release relay R60 whereby the latter relay is operated and the connections completed therein over the wipers of the switch 51 to the calling register 70 and the sender 90 are interrupted at contacts 61, 62, 63, 64, 65 and 66.

When the calling register 70 is disconnected from the primary selector 50 the line relay R110 therein is restored, whereupon the transistor TR115 is rendered nonconductive a short time thereafter and the hold relay R120 is restored. Upon restoring the hold relay R120 interrupts at contacts 122 the circuit for operating the transistor TR126 and closes at contacts 124 battery potential to the conductor 103 whereby the calling register 70 is again marked as idle to the primary selectors having access thereto. In addition, when the relay R120 restores, ground potential is removed at contacts 125 from the conductor 144 extending to the individual registers in the office code registers 230, etc., and in the directory number registers 260, etc., whereby the ones of the individual registers operated in a marking condition are restored so that approximately −48 volts appears on the output conductors thereof. Further, the relay R120 upon restoring interrupts at contacts 121 the circuit for operating the marking circuits 150A, etc. Accordingly, the register-translator-sender group, including the calling register 70 is completely released and is prepared to be seized by another selector having access thereto and to receive and to register digit impulses transmitted therefrom.

The transistors used in the call register of the present invention are preferably of the N–P–N semi-conductor junction type, although it is understood that other types of transistors may be used with corresponding variations in the circuits. Though the above described connections between the call register and the related equipment in the telephone system are at present believed to be preferred, it is understood that various obvious modifications may be made in these equipment connections. Accordingly, it is clear that the above described embodiment is merely illustrative of the principles of the invention and that others skilled in the art may construct other modified embodiments, and it is intended to cover in the appended claims all such modifications that fall within the true spirit and scope of the invention.

What is claimed is:

1. In a telephone system, a register apparatus and means for transmitting to said apparatus a plurality of series of impulses, each series corresponding to a decimal digit of a subscriber's designation, said apparatus comprising impulse responsive means, binary register means, a binary counting chain including a number of bi-stable circuits, and a sequence control device interposed between the bi-stable circuits and said binary register means, said binary counting chain being repeatedly set under the control of said impulse responsive means and reset between each of said settings, for successively recording each of said series of decimal digital impulses in the bi-stable circuits of said chain, and said sequence control device being actuated at the end of each series under the control of said impulse responsive means, whereby the recordings in the bi-stable circuits in said counting chain are transferred, digit by digit, to said binary register means.

2. In a telephone system, the combination as set forth in claim 1 wherein said bi-stable circuits in said counting chain are in the form of transistor triggers.

3. In a telephone system, a register apparatus and means for transmitting to said apparatus a plurality of series of impulses, each series corresponding to a decimal digit of a subscriber's designation, said apparatus comprising impulse responsive means, a plurality of individual binary registers, one for each of said digits, a binary counting chain common to said plurality of individual registers, both said counting chain and each of said individual registers including a number of bi-stable circuits, and a sequence control device interposed between the bi-stable circuits of said common counting chain and the corresponding bi-stable circuits of said individual registers, said binary counting chain being repeatedly set under the control of said impulse responsive means and reset between each of said settings for successively recording each of said series of decimal digital impulses in the bi-stable circuits of said chain, and said sequence control device being actuated at the end of each series under the control of said impulse responsive means, whereby the recordings in the bi-stable circuits of said common counting chain are transferred, digit by digit, to the corresponding bi-stable circuits of said individual registers.

4. In a telephone system, a register apparatus and means for transmitting to said apparatus a series of decimal digital impulses, said apparatus comprising impulse responsive means, a binary counting chain controlled by the last-mentioned means and a binary storage register, said counting chain including a plurality of bi-stable semiconductor circuits, said binary storage register including a plurality of binary storage elements, connections being provided between said bi-stable circuits and said storage elements, and said apparatus also comprising semiconductor gates interposed in said connections and means controlled by said impulse responsive means for rendering said gates conductive at the end of said impulse series.

5. In a telephone system, the combination as set forth in claim 4, wherein the means controlled by said impulse responsive means include a transistor having an input and an output circuit, a fast-acting relay connected in said output circuit, and a resistance-capacitance combination connected to said input circuit, said relay being rendered slow-to-release by said resistance-capacitance combination via said transistor, for rendering said gates conductive at the end of said series.

6. In a telephone system, the combination as set forth in claim 4, wherein each of said binary storage elements includes a pair of transistors so connected that only one of said transistors is conducting at any given time.

7. In a telephone system, the combination as set forth in claim 6 and further including means, effective upon the opening of said gates, for impressing potentials, in accordance with the recordings in said bi-stable circuits, upon the transistor pairs in respective ones of said binary storage elements, and means for locking said transistor pairs, irrespective of the reclosing of said gates, in the respective states of conduction in which they have thus been selectively set.

8. In a telephone system, a register apparatus and means for transmitting to said apparatus a plurality of series of impulses, each series corresponding to a decimal digit of a subscriber's designation, said apparatus comprising impulse responsive means, a plurality of individual binary registers, one for each of said digits, a binary counting chain common to said plurality of individual registers, both said counting chain and each of said individual registers including a number of bi-stable circuits, a sequence control device and semiconductor gating circuits both interposed between the bi-stable circuits of said common counting chain and the corresponding bi-stable circuits of said individual registers, said binary counting chain being repeatedly set under the control of said impulse responsive means and reset between each of said settings for successively recording each of said series of decimal digital impulses in the bi-stable circuits of said chain, said semiconductor gating circuits being rendered conductive, and said sequence device being actuated, once at the end of each impulse series, under the control of said impulse responsive means, whereby the recordings in the bi-stable circuits of said common counting chain are transferred, digit by digit, to the corresponding bi-stable circuits of said individual registers.

No references cited.